United States Patent
Lee et al.

(10) Patent No.: US 11,017,572 B2
(45) Date of Patent: May 25, 2021

(54) GENERATING A PROBABILISTIC GRAPHICAL MODEL WITH CAUSAL INFORMATION

(71) Applicant: Babylon Partners Limited, London (GB)

(72) Inventors: Ciarán Mark Lee, London (GB); Christopher Robert Hart, London (GB); Jonathan George Richens, London (GB); Saurabh Johri, London (GB)

(73) Assignee: Babylon Partners Limited, London (GB)

( * ) Notice: Subject to any disclaimer, the term of this patent is extended or adjusted under 35 U.S.C. 154(b) by 0 days.

(21) Appl. No.: 16/289,467

(22) Filed: Feb. 28, 2019

(65) Prior Publication Data

US 2020/0279417 A1    Sep. 3, 2020

(51) Int. Cl.
*G06F 17/00* (2019.01)
*G06T 11/20* (2006.01)
*G06N 7/00* (2006.01)

(52) U.S. Cl.
CPC ............ *G06T 11/206* (2013.01); *G06N 7/005* (2013.01)

(58) Field of Classification Search
CPC ........ G06N 7/005; G06N 3/0454; G06N 3/08; G06N 3/082; G16H 50/70; G16H 50/20; G06T 7/143; G06T 11/206
See application file for complete search history.

(56) References Cited

U.S. PATENT DOCUMENTS

| | | | |
|---|---|---|---|
| 2011/0099059 A1* | 4/2011 | Agarwal | G06Q 30/02 705/14.43 |
| 2011/0202322 A1* | 8/2011 | Statnikov | G06N 20/00 703/2 |
| 2013/0159240 A1* | 6/2013 | Singh | G05B 23/0275 706/51 |

(Continued)

OTHER PUBLICATIONS

Causal Inference via Kernel Deviance Measures, https://arxiv.org/abs/1804.04622, posted on Apr. 12, 2018 (Year: 2018).*

(Continued)

*Primary Examiner* — Weiming He
(74) *Attorney, Agent, or Firm* — McDermott Will & Emery LLP

(57) ABSTRACT

A computer-implemented method of generating a PGM with causal information, said graphical model containing the causal relationship between a first variable and a second variable, the method comprising: receiving data at a processor, said data showing a correlation between the first variable and a second variable; producing a third variable by reducing the dimensionality of the graphical representation of the two dimensional data defined by the first variable and the second variable, determining determine the causal relationship between the first and third variables and the second and third variable, the causal discovery algorithm being able to determine if the first variable causes the third variable, the third variable causes the first variable, the second variable causes the third variable and the third variable causes the second variable; and outputting a graphical model indicating the direction of edges in a graphical representation of said PGM.

14 Claims, 8 Drawing Sheets

(56) References Cited

U.S. PATENT DOCUMENTS

| | | | | |
|---|---|---|---|---|
| 2013/0257873 | A1* | 10/2013 | Isozaki | G06T 11/206 345/440 |
| 2018/0012135 | A1* | 1/2018 | Chakraborty | G06F 16/2455 |
| 2019/0165988 | A1* | 5/2019 | Wang | H04L 41/065 |

OTHER PUBLICATIONS

D. Koller and N. Friedman, Probabilistic graphical models: principles and techniques. MIT press, 2009. (Year: 2009).*

Lopez-Paz, D.; Muandet, K.; Scholkopf, B.; and Tolstikhin, I. 2015. Towards a learning theory of cause-effect inference. In International Conference on Machine Learning, 1452-1461.

Mitrovic, J.; Sejdinovic, D.; and Teh, Y. W. 2018. Causal inference via kernel deviance measures. arXiv preprint arXiv:1804.04622.

Shimizu, S.; Hoyer, P. O.; Hyvarinen, A.; and Kerminen, A. 2006. A linear non-gaussian acyclic model for causal discovery. Journal of Machine Learning Research 7(Oct.):2003-2030.

Silva, R.; Scheine, R.; Glymour, C.; and Spirtes, P. 2006. Learning the structure of linear latent variable models. Journal of Machine Learning Research 7(Feb.):191-246.

Spirtes, P.; Glymour, C.; and Scheines, R. 2000. Causation, Prediction, and Search. Adaptive computation and machine learning. The MIT press, 2nd edition.

Spirtes, P.; Meek, C.; and Richardson, T. 1995. Causal inference in the presence of latent variables and selection bias. In Proceedings of the Eleventh conference on Uncertainty in artificial intelligence, 499-506. Morgan Kaufmann Publishers Inc.

Tenenbaum, J. B.; De Silva, V.; and Langford, J. C. 2000. A global geometric framework for nonlinear dimensionality reduction. science 290(5500):2319-2323.

Tsamardinos, I.; Brown, L. E.; and Aliferis, C. F. 2006. The max-min hill-climbing bayesian network structure learning algorithm. Machine learning 65(1):31-78.

Zhang, K., and Hyvarinen, A. 2009. On the identifiability of the post-nonlinear causal model. In Proceedings of the twenty-fifth conference on uncertainty in artificial intelligence, 647-655. AUAI Press.

Zhang, K.; Peters, J.; Janzing, D.; and Scholkopf, B. 2012. Kernel-based conditional independence test and application in causal discovery. arXiv preprint arXiv:1202.3775.

Abdollahi, A., and Pattipati, K. 2016. Unification of leaky noisy or and logistic regression models and maximum a posteriori inference for multiple fault diagnosis using the unified model. In DX Conference (Denver, Co).

Arora, S.; Ge, R.; Ma, T.; and Risteski, A. 2017. Provable learning of noisy-or networks. In Proceedings of the 49th Annual ACM SIGACT Symposium on Theory of Computing, 1057-1066. ACM.

Balke, A., and Pearl, J. 1994. Probabilistic evaluation of counterfactual queries. In AAAI.

Bareinboim, E.; Forney, A.; and Pearl, J. 2015. Bandits with unobserved confounders: A causal approach. In Advances in Neural Information Processing Systems, 1342-1350.

Buesing, L.; Weber, T.; Zwols, Y.; Racaniere, S.; Guez, A.; Lespiau, J.-B.; and Heess, N. 2018. Woulda, coulda, shoulda: Counterfactually-guided policy search. arXiv:1811.06272.

Douglas, L.; Zarov, I.; Gourgoulias, K.; Lucas, C.; Hart, C.; Baker, A.; Sahani, M.; Perov, Y.; and Johri, S. 2017. A universal marginalizer for amortized inference in generative models. arXiv preprint arXiv:1711.00695.

Halpern, Y., and Sontag, D. 2013. Unsupervised learning of noisy-or bayesian networks. arXiv preprint arXiv:1309.6834.

Heckerman, E., and Nathwani, N. 1992. Toward normative expert systems: part ii probability-based representations for efficient knowledge acquisition and inference. Methods of information in Medicine 31(02):106-116.

Heckerman, D. E.; Horvitz, E. J.; and Nathwani, B. N. 1992. Toward normative expert systems: Part i the pathfinder project. Methods of information in medicine 31(02):90-105.

Heckerman, D. 1990. A tractable inference algorithm for diagnosing multiple diseases. In Machine Intelligence and Pattern Recognition, vol. 10. Elsevier. 163-171.

Henrion, M. 1991. Search-based methods to bound diagnostic probabilities in very large belief nets. In Uncertainty Proceedings 1991. Elsevier. 142-150.

Johansson, F.; Shalit, U.; and Sontag, D. 2016. Learning representations for counterfactual inference. In International Conference on Machine Learning, 3020-3029.

Liu, Y.; Liu, K.; and Li, M. 2010. Passive diagnosis for wireless sensor networks. IEEE/ACM Transactions on Networking (TON) 18(4):1132-1144.

Louizos, C.; Shalit, U.; Mooij, J. M.; Sontag, D.; Zemel, R.; and Welling, M. 2017. Causal effect inference with deep latent-variable models. In Advances in Neural Information Processing Systems, 6446-6456.

Miller, R. A.; McNeil, M. A.; Challinor, S. M.; Masarie Jr, F. E.; and Myers, J. D. 1986. The internist-1/quick medical reference projectstatus report. Western Journal of Medicine 145(6):816.

Miller, R. 2010. A history of the internist-1 and quick medical reference (qmr) computer-assisted diagnosis projects, with lessons learned. Yearbook of medical informatics 19(01):121-136.

Morris, Q. 2001. Recognition networks for approximate inference in bn20 networks. In Proceedings of the Seventeenth conference on Uncertainty in artificial intelligence, 370-377. Morgan Kaufmann Publishers Inc.

Neyman, J. 1990. On the application of probability theory to agricultural experiments.

Nikovski, D. 2000. Constructing bayesian networks for medical diagnosis from incomplete and partially correct statistics. IEEE Transactions on Knowledge & Data Engineering (4):509-516.

Pearl, J. 1999. Probabilities of causation: three counterfactual interpretations and their identification. Synthese 121(1-2):93-149.

Pearl, J. 2009. Causality (2nd edition). Cambridge University Press.

Pearl, J. 2018. Theoretical impediments to machine learning with seven sparks from the causal revolution. arXiv preprint arXiv:1801.04016.

Perreault, L.; Strasser, S.; Thornton, M.; and Sheppard, J.W. 2016. A noisy-or model for continuous time bayesian networks. In FLAIRS Conference, 668-673.

Razzaki, S.; Baker, A.; Perov, Y.; Middleton, K.; Baxter, J.; Mullarkey, D.; Sangar, D.; Taliercio, M.; Butt, M.; Majeed, A.; et al. 2018. A comparative study of artificial intelligence and human doctors for the purpose of triage and diagnosis. arXiv preprint arXiv:1806.10698.

Richardson, T. S., and Robins, J. M. 2013. Single world intervention graphs (swigs): A unification of the counterfactual and graphical approaches to causality.

Rubin, D. B. 1978. Bayesian inference for causal effects: The role of randomization. The Annals of statistics 34-58.

Schulam, P., and Saria, S. 2017. Reliable decision support using counterfactual models. In Advances in Neural Information Processing Systems, 1697-1708.

Semigran, H. L.; Linder, J. A.; Gidengil, C.; and Mehrotra, A. 2015. Evaluation of symptom checkers for self diagnosis and triage: audit study. bmj 351:h3480.

Shpitser, I., and Pearl, J. 2007. What counterfactuals can be tested. In Proceedings of the Twenty-Third Conference on Uncertainty in Artificial Intelligence, 352-359. AUAI Press.

Shwe, M. A.; Middleton, B.; Heckerman, D. E.; Henrion, M.; Horvitz, E. J.; Lehmann, H.; and Cooper, G. F. 1991. Probabilistic diagnosis using a reformulation of the internist-1/qmr knowledge base. Methods of information in Medicine 30(04)241-255.

Subbaswamy, A., and Saria, S. 2018. Counterfactual normalization: Proactively addressing dataset shift using causal mechanisms. Proceedings of the 34th Conference on Uncertainty in Artificial Intelligence, arXiv:1808.03253.

Yongli, Z.; Limin, H.; and Jinling, L. 2006. Bayesian networks-based approach for power systems fault diagnosis. IEEE Transactions on Power Delivery 21(2):634-639.

Allen, J.-M. A.; Barrett, J.; Horsman, D. C.; Lee, C. M.; and Spekkens, R. W. 2017. Quantum common causes and quantum causal models. Physical Review X 7(3):031021.

(56) References Cited

OTHER PUBLICATIONS

Chaves, R.; Lemos, G. B.; and Pienaar, J. 2018. Causal modeling the delayed-choice experiment. Physical Review Letters 120(19):190401.

Chaves, R.; Majenz, C.; and Gross, D. 2015. Information-theoretic implications of quantum causal structures. Nature communications 6:5766.

Daniusis, P.; Janzing, D.; Mooij, J.; Zscheischler, J.; Steudel, B.; Zhang, K.; and Scholkopf, B. 2012. Inferring deterministic causal relations. arXiv preprint arXiv:1203.3475.

Fonollosa, J. A. 2016. Conditional distribution variability measures for causality detection. arXiv preprint arXiv:1601.06680.

Friedman, N.; Geiger, D.; and Goldszmidt, M. 1997. Bayesian network classifiers. Machine learning 29(2-3):131-163.

Gasse, M.; Aussem, A.; and Elghazel, H. 2012. An experimental comparison of hybrid algorithms for bayesian network structure learning. In Joint European Conference on Machine Learning and Knowledge Discovery in Databases, 58-73. Springer.

Goudet, O.; Kalainathan, D.; Caillou, P.; Lopez- Paz, D.; Guyon, I.; Sebag, M.; Tritas, A.; and Tubaro, P. 2017. Learning functional causal models with generative neural networks. arXiv preprint arXiv:1709.05321.

Hoyer, P.; Janzing, D.; Mooij, J.; Peters, J.; and Scholkopf, B. 2009. Nonlinear causal discovery with additive noise models. Neural Information Processing Systems Foundation.

Janzing, D.; Mooij, J.; Peters, J.; and Scholkopf, B. 2012a. Identifying counfounders using additive noise models. arXiv:1205.2640v1[stat.ML].

Janzing, D.; Mooij, J.; Zhang, K.; Lemeire, J.; Zscheischler, J.; Daniusis, P.; Steudel, B.; and Scholkopf, B. 2012b. Information-geometric approach to inferring causal directions. Artificial Intelligence 182:1-31.

Jutten, C., and Karhunen, J. 2003. Advances in nonlinear blind source separation.

Lee, C. M., and Hoban, M. J. 2018. Towards device-independent information processing on general quantum networks. Physical Review Letters 120(2):020504.

Lee, C. M., and Spekkens, R. W. 2017. Causal inference via algebraic geometry: feasibility tests for functional causal structures with two binary observed variables. Journal of Causal Inference 5(2).

Lee, C. M. 2018. Device-independent certification of non-classical measurements via causal models. arXiv preprint arXiv:1806.10895.

Levene, H. 1960. Robust tests for equality of variances. In Contributions to Probability and Statistics: Essays in Honour of Harold Hotelling, 278-292. Stanford University Press.

Lichman, M. 2013. UCI machine learning repository. URL http://archive.ics.uci.edu/ml.

Locatello, F.; Bauer, S.; Lucic, M.; Gelly, S.; Scholkopf, B.; and Bachem, O. 2018. Challenging common assumptions in the unsupervised learning of disentangled representations. arXiv:1811.12359.

\* cited by examiner

US 11,017,572 B2

GENERATING A PROBABILISTIC GRAPHICAL MODEL WITH CAUSAL INFORMATION

FIELD

Embodiments described herein relate to methods and systems for generating a probabilistic graphical model with causal information.

BACKGROUND

Causal knowledge is crucial to understanding the world; it is a prerequisite to reasoning about the effects of interventions and ascertaining the truth of counterfactuals. As such, the discovery of causal relationships is a fundamental problem in science. In recent years, many elegant approaches to discovering causal relationships between two variables from uncontrolled statistical data have been proposed. However, most of these approaches deal only with purely directed causal relationships and cannot detect latent common causes.

Causal relationships, unlike purely statistical associations, allow one to reason about the consequences of interventions and determine the truth of counterfactual queries. The gold standard for discovering such causal relationships is the randomized controlled trial. However, there are many situations in which such trials cannot be employed: they could be unethical, exorbitantly expensive, or almost physically impossible—as when the variables in question are astronomical bodies. As such, methods for discovering the causal structure from uncontrolled statistical data are of the utmost importance.

DETAILED DESCRIPTION

Figure 1:
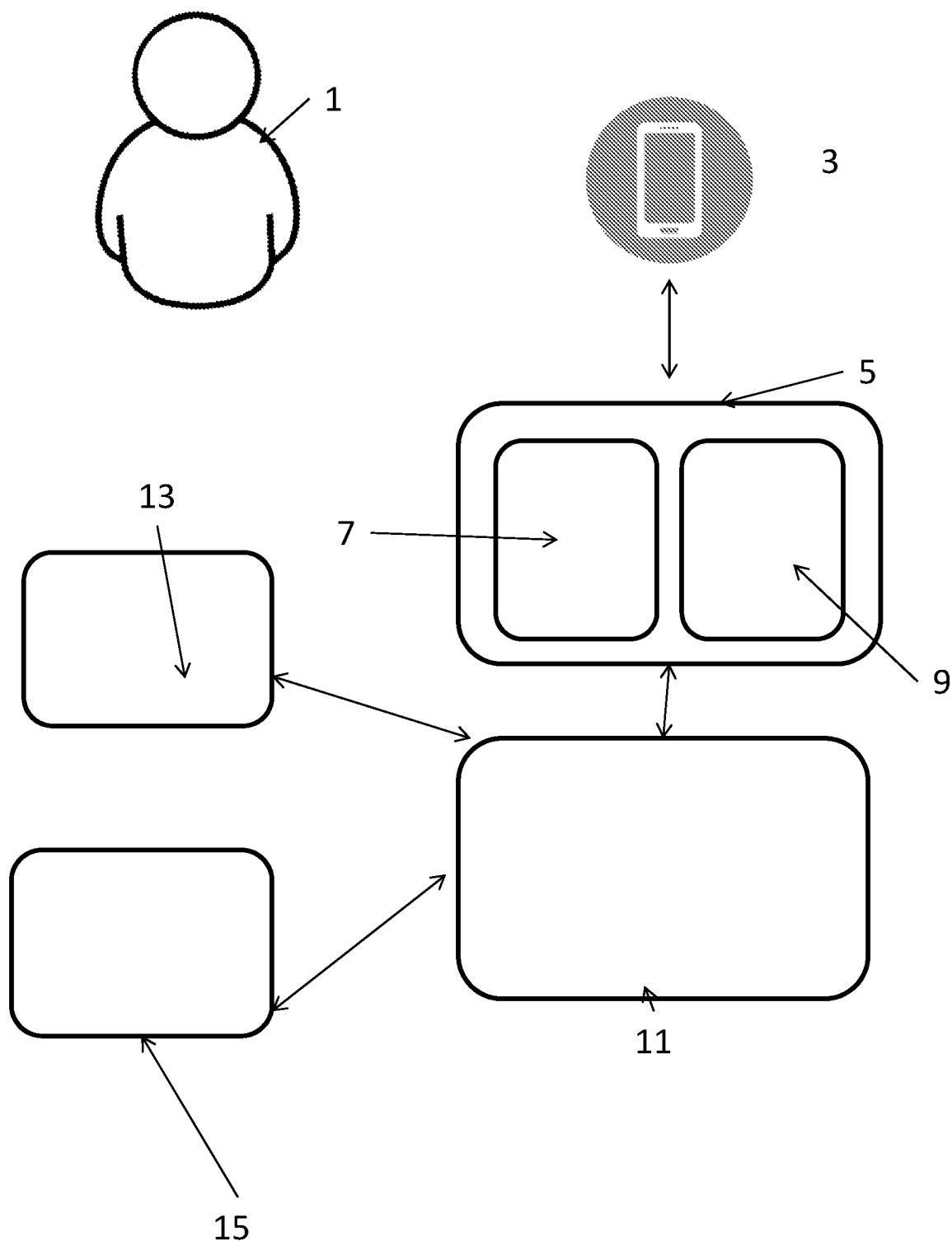
FIG. 1 is a schematic of a system in accordance with an embodiment.

In an embodiment, a method of generating a probabilistic graphical model with causal information is provided, said graphical model containing the causal relationship between a first variable and a second variable the method comprising receiving data, said data showing a correlation between the first variable and a second variable. The method also includes producing a third variable by determining a manifold in the two dimensional data defined by the first variable and the second variable, the third variable describing the manifold. The method also includes applying a causal discovery algorithm to determine the causal relationship between the first and third variables and the second and third variable, the causal discovery algorithm being able to determine if the first variable causes the third variable, the third variable causes the first variable, the second variable causes the third variable and the third variable causes the second variable. The method also includes determining the structure of the causal relationship between the first and second variables, wherein a latent variable is determined to be the cause of the first and second variable if the third variable causes the first and second variables, but where the third variable is not caused by the first or second variables. The method also includes outputting a graphical model with the determined causal structure.

The disclosed system and method provides an improvement to computer functionality by allowing computer performance of a function not previously performed by a computer. Specifically, the disclosed system provides for the efficient generation of a probabilistic graphical model where the underlying causal nature can be determined by a computer from raw data and specifically, a latent common cause for two variables can be determined either instead of or in addition to a direct causal relationship between the two variables. It achieves this by extracting at least one variable that can describe a manifold in the data from the two variables and treating this further variable as a potential latent common cause, the system then applies decision making criteria to determine the underlying causal structure of a graph describing the relationship between these variables.

Also, the systems and methods operate on raw data and do not require a labelled or extensive training set.

In the embodiments described herein a purely directed causal discovery algorithm is turned into one that can also discover latent common causes. The method is tested by showing it can turn the kernel conditional deviance (KCDC) algorithm of Mitrovic, J.; Sejdinovic, D.; and Teh, Y. W. 2018. Causal inference via kernel deviance measures. arXiv preprint arXiv:1804.04622, the current state-of-the-art in distinguishing purely directed causal structures between two variables—into an algorithm that can distinguish a latent common cause from directed causes in both synthetic and real datasets without sacrificing the original performance in distinguishing purely directed causal structures.

Thus, a directed causal discovery algorithm can be turned into one that can discover latent common causes—while maintaining the original performance in distinguishing directed causal relations.

The embodiments described herein allow the discovery of both purely directed causal relationships and latent common causes. However, the embodiments detect latent common causes without needing to impose stern restrictions on the underlying causal model—such as enforcing linearity or demanding that noise be additive or require huge amounts of training data to learn to accurately detect latent common causes. Thus the embodiments provide a practical and technical solution for developing general, unconstrained methods for detecting latent common causes.

The above embodiment refers to determining a manifold, this can be any algorithm that allows the data to be more efficiently represented. In an embodiment, it is a dimensionality reduction algorithm.

In one embodiment, the manifold is described by a single third variable. Thus, the algorithm operates as a dimensionality reduction algorithm reducing a 2D feature space to a 1D space.

In the above, determining the structure of the causal relationship may comprise determining that the first variable causes the second variable if the third variable causes the first and second variables, the third variable is caused by the first variable, but where the third variable is not caused by the second variable. Also, determining the structure of the causal relationship may comprise determining that the second variable causes the first variable if the third variable causes the first and second variables, the third variable is caused by the second variable, but where the third variable is not caused by the first variable.

In an embodiment, the causal discovery algorithm determines whether a variable causes another variable by evaluating asymmetry between the variables. For example, the causal discovery algorithm is selected from KCDC or an additive noise model.

In an embodiment, the first and second variables are binary variables and wherein noise is added to the binary variables prior to the determination of the manifold.

In an embodiment, the manifold is determined using a non-linear algorithm, for example Isomap, principal component analysis (PCA), or independent component analysis (ICA).

The above method can be applied to a medical probabilistic graphical model. For example, the model can comprise diseases, symptoms and risk factors as variables.

As will be explained in relation to FIG. 1 later, a method of determining a response to a user inputted query is provided, using a probabilistic graphical model, the method comprising receiving a user inputted query. The method also includes identifying a node in said probabilistic graphical model "PGM" related to said query. The method also includes performing inference on said PGM to provide a response to said user, wherein, said graphical model contains a causal relationship between a first variable and a second variable. The PGM may be constructed by receiving data, said data showing a correlation between the first variable and a second variable. The PGM may also be constructed by producing a third variable by determining a manifold in the two dimensional data defined by the first variable and the second variable, the third variable describing the manifold. The PGM may also be constructed by applying a causal discovery algorithm to determine the causal relationship between the first and third variables and the second and third variable, the causal discovery algorithm being able to determine if the first variable causes the third variable, the third variable causes the first variable, the second variable causes the third variable and the third variable causes the second variable. The PGM may also be constructed by determining the structure of the causal relationship between the first and second variables, wherein a latent variable is determined to be the cause of the first and second variable if the third variable causes the first and second variables, but where the third variable is not caused by the first or second variables. The PGM may also be constructed by outputting a graphical model with the determined causal structure.

In a further embodiment, a system is provided adapted to generate a probabilistic graphical model with causal information, said graphical model containing the causal relationship between a first variable and a second variable, the system comprising a processor, the processor being adapted to receive data from a database, said data showing a correlation between the first variable and a second variable. The processor is also adapted to produce a third variable by determining a manifold in the two dimensional data defined by the first variable and the second variable, the third variable describing the manifold. The processor is also adapted to apply a causal discovery algorithm to determine the causal relationship between the first and third variables and the second and third variable, the causal discovery algorithm being able to determine if the first variable causes the third variable, the third variable causes the first variable, the second variable causes the third variable and the third variable causes the second variable. The processor is also adapted to determine the structure of the causal relationship between the first and second variables, wherein a latent variable is determined to be the cause of the first and second variable if the third variable causes the first and second variables, but where the third variable is not caused by the first or second variables. The processor is also adapted to output a graphical model with the determined causal structure.

In a further embodiment, a non-transitory carrier medium is provided carrying computer readable instructions being adapted to cause a computer to run the above described method.

FIG. 1 is a schematic of a diagnostic system. In one embodiment, a user 1 communicates with the system via a mobile phone 3. However, any device could be used, which is capable of communicating information over a computer network, for example, a laptop, tablet computer, information point, fixed computer etc.

The mobile phone 3 will communicate with interface 5. Interface 5 has 2 primary functions, the first function 7 is to take the words uttered by the user and turn them into a form that can be understood by the inference engine 11. The second function 9 is to take the output of the inference engine 11 and to send this back to the user's mobile phone 3.

In some embodiments, Natural Language Processing (NLP) is used in the interface 5. NLP helps computers interpret, understand, and then use everyday human language and language patterns. It breaks both speech and text down into shorter components and interprets these more manageable blocks to understand what each individual component means and how it contributes to the overall meaning, linking the occurrence of medical terms to the Knowledge Graph. Through NLP it is possible to transcribe consultations, summarise clinical records and chat with users in a more natural, human way.

However, simply understanding how users express their symptoms and risk factors is not enough to identify and provide reasons about the underlying set of diseases. For this, the inference engine 11 is used. The inference engine is a powerful set of machine learning systems, capable of reasoning on a space of >100 s of billions of combinations of symptoms, diseases and risk factors, per second, to suggest possible underlying conditions. The inference engine can provide reasoning efficiently, at scale, to bring healthcare to millions.

In an embodiment, the Knowledge Graph 13 is a large structured medical knowledge base. It captures human knowledge on modern medicine encoded for machines. This is used to allows the above components to speak to each other. The Knowledge Graph keeps track of the meaning behind medical terminology across different medical systems and different languages.

In an embodiment, the patient data is stored using a so-called user graph 15.

Figure 2:
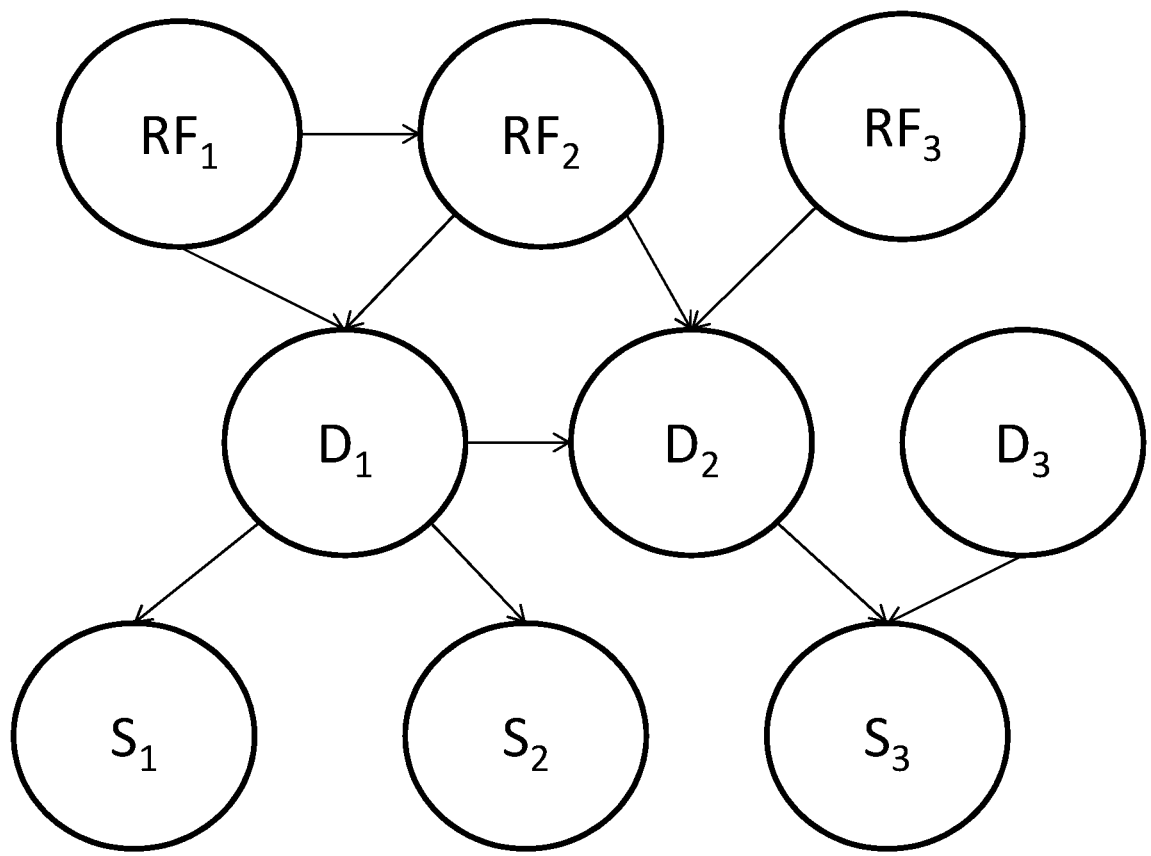
FIG. 2 is a diagram of a probabilistic graphical model of the type that can be used with the system of FIG. 1.

FIG. 2 is a depiction of a graphical model of the type used in the system of FIG. 1.

The graphical model provides a natural framework for expressing probabilistic relationships between random variables, to facilitate causal modelling and decision making. In the model of FIG. 2, when applied to diagnosis, D stands for diagnosis, S for symptom and RF for Risk Factor. Three layers: risk factors, diseases and symptoms. Risk factors causes (with some probability) influence other risk factors and diseases, diseases causes (again, with some probability) other diseases and symptoms. There are prior probabilities and conditional marginals that describe the "strength" (probability) of connections. In embodiments, noisy-OR and noisy-MAX modelling assumptions are used.

In this simplified specific example, the model is used in the field of diagnosis. In the first layer, there are three nodes $S_1$, $S_2$ and $S_3$, in the second layer there are three nodes $D_1$, $D_2$ and $D_3$ and in the third layer, there are two nodes $RF_1$, $RF_2$ and $RF_3$.

In the graphical model of FIG. 2, each arrow indicates a dependency. For example, $D_1$ depends on $RF_1$ and $RF_2$. $D_2$ depends on $RF_2$, $RF_3$ and $D_1$. Further relationships are possible. In the graphical model shown, each node is only dependent on a node or nodes from a different layer. However, nodes may be dependent on other nodes within the same layer.

In an embodiment, the graphical model of FIG. 2 is a Bayesian Network. In this Bayesian Network, the network represents a set of random variables and their conditional dependencies via a directed acyclic graph. Thus, in the network of FIG. 2, given full (or partial) evidence over symptoms $S_1$, $S_2$ and $S_3$ and risk factors $RF_1$, $RF_2$ and $RF_3$ the network can be used to represent the probabilities of various diseases $D_1$, $D_2$, and $D_3$.

In an embodiment, a structural causal model (SCM) framework is used as the basis for the PGM. Here, a causal structure corresponds to a directed acyclic graph (DAG) between the observed and latent variables of interest. Each variable is a deterministic function of its parents together with some latent, independent noise term. A causal model corresponds to a DAG together with the functions and a specification of the priors over the latent noise terms.

In the embodiments described herein an algorithm is described that can distinguish a latent common cause from directed causes in both synthetic and real datasets without sacrificing the original performance in distinguishing purely directed causal structures.

Methods for discovering the causal structure underlying a data generating process largely fall into two categories.

The first, which can be termed global causal discovery, attempts to reconstruct the skeleton of the causal structure, that is, the (partially) undirected version of the DAG. This approach is broadly split into two categories: constraint based and score based. The constraint based approach employs conditional independence tests between the variables in question to determine which variables should share an edge in the causal structure. There has also been work employing kernal-based conditional independence tests. The score based approach introduces a scoring function, such as Minimum Description Length, that evaluates each network with respect to some training data, and then searches for the best network according to this function. Hybrid approaches that employ both constraint and score based techniques appear to outperform either technique alone.

The main drawback of global discovery algorithms is that they are not always able to orient edges between dependent variables in the causal structure. That is, given correlated variables A and B, the above methods are generally unable to distinguish the between the causal structures of FIGS. 3(a) and 3(b).

The second category of causal discovery algorithm appearing, which can be termed local, or bi-variate, causal discovery, aims to address this problem by exploiting some notion of asymmetry between cause and effect. These methods specify a set of assumptions which make such asymmetries manifest.

The first type of assumption that can be used is known as the structural or functional causal model approach, specifies that each effect is a deterministic function of its cause together with some latent and independent noise term. The first such algorithm, termed Linear Non-Gaussian Additive Model (LiNGAM) algorithm assumes the functions in the causal model are linear and the latent noise variables are non-Gaussian random variables.

The other prototypical example, called the Additive Noise Model (ANM) algorithm, allows the effect to be an arbitrary function of the cause, but assumes the effect only depends on the latent noise term in an additive fashion. The ANM algorithm can distinguish between the two structures in FIGS. 3(a) and (b) as long as the additive assumption holds. The ANM has been generalised to allow the effect to depend on the cause and noise term in a post-linear fashion. Finally, the Confounding Additive Noise (CAN) algorithm also extends the ANM algorithm to deal with the case of latent common causes.

The second type of assumption stipulates that the cause P (cause) should be independent of the causal mechanism P (effect|cause). An information geometric approach to measuring such Independence's has been proposed (Daniusis et al. 2012). This method is only able to distinguish the two causal structures in FIGS. 3(a) and (b). In contrast to the previous paragraph, this approach does not require any specific parametric functional relationship to hold between cause and effect.

The last type of assumption entails that the causal mechanism P(effect|cause) should be "simpler," given some quantifiable notion of "simple," than the acausal mechanism P (cause|effect). The kernel conditional deviance causal discovery (KCDC) (Mitrovic, J.; Sejdinovic, D.; and Teh, Y. W. 2018. Causal inference via kernel deviance measures arXiv preprint arXiv:1804.04622) algorithm uses conditional kernel mean embeddings to establish a norm on conditional probabilities and uses the variance of these norms as a simplicity measure. This method is the current state-of-the-art at distinguishing between the two causal structures in FIGS. 3(a) and (b).

Finally, causal discovery can also been recast as a learning problem. This approach has allowed all structures from FIGS. 3(a) to (c) and FIGS. 4(a) and (b) to be distinguished. However, such methods require large amounts of labelled training data to function accurately.

While the ANM algorithm has been extended to deal with latent common causes via the CAN algorithm, its generalisations, such as the kernel conditional deviance and information-geometric algorithm, have not.

Figure 3:
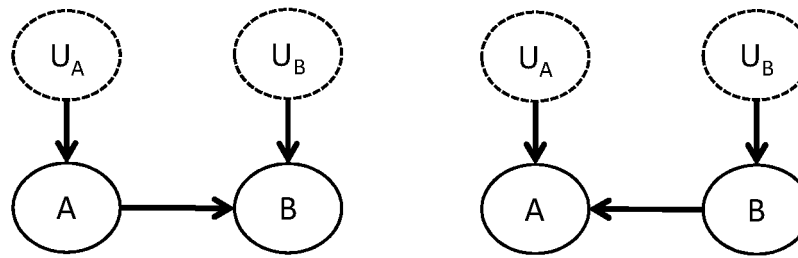
FIGS. 3(a) to 3(c) are causal structures where nodes with solid lines represent observable variables and nodes with dotted lines represent latent variables, where in the causal structure of FIG. 3(a) A causes B, in FIG. 3(b) B causes A and in FIG. 3(c) Latent common Cause C causes A and B.
Figure 3:
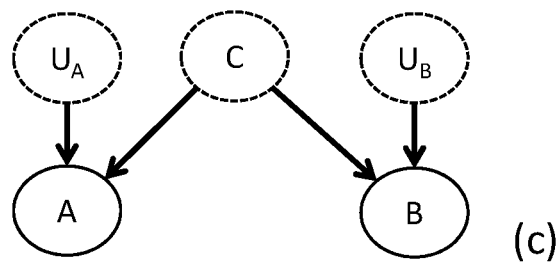
Figure 4:
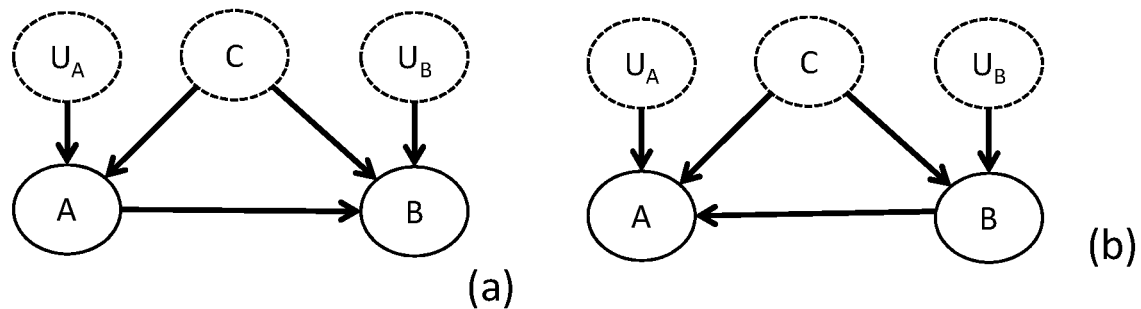
FIGS. 4(a) and 4(b) are causal structures where nodes with solid lines represent observable variables and nodes with dotted lines represent latent variables, where in the causal structure of FIG. 4(a) A causes B and there is a latent common cause C between FIG. 5 shows causal structures demonstrating reduction from direct cause to common cause, the last equality follows because 2nd and $3^{rd}$ causal structure both belong to equivalence class consistent with uA⊥uB.

In an embodiment, a method is provided that takes as input a purely directed causal discovery algorithm and out-puts a new algorithm that can distinguish all three causal structures in FIG. 3.

As discussed in more detail below, in an embodiment, the basic idea underlying idea is that distinguishing between all causal structures in FIGS. 3(a) to (c) can be accomplished via a three-step procedure.

Step 1—Every causal structure is reduced to one involving purely common causes, that is, one with no directed arrows between observed variables. This reduction is purely mathematical in nature and leads to an observationally equivalent causal model.

Step 2—A manifold learning or dimensionality reduction algorithm is applied to samples from A, B to determine the parameterization (up to rescaling, etc.) of these common causes.

Step 3—Known directed causal discovery algorithms, that is algorithms that can distinguish between the causal structures from FIGS. 3(a) and (b) are applied to the purely common cause DAGs from the previous steps to determine the original causal structure.

The details of the mathematical reduction mentioned in step 1 above will now be illustrated.

Every causal model wherein there is a directed causal influence between A and B (either A→B or B→A) is observationally equivalent to one that is purely common cause. To see this, consider the causal structure from FIG. 3(a). A causal model for this causal structure corresponds to specifying the functional dependencies between A, B and their parents:

$$A = f(u_A) \quad \text{(Eq. 1)}$$

$$B = g(A, u_B) \quad \text{(Eq. 2)}$$

Substituting $f(u_A)$ for A in Eq. 2 obtains:

$$B = g(f(u_A), u_B) \quad \text{(Eq. 3)}$$

One can define $u'_A := f(u_A)$ resulting in the functional relations:

$$A = u'_A \quad \text{(Eq. 4)}$$

$$B = B(u'_A, u_B B) \quad \text{(Eq. 5)}$$

The directed influence of A on B has hence been replaced by the latent "common cause" $u_A$. This is outlined graphically in the two causal structures in FIGS. 5(a) and 5(b). A similar reduction can be applied to any causal model with a directed causal influence between observed variables.

Figure 6:
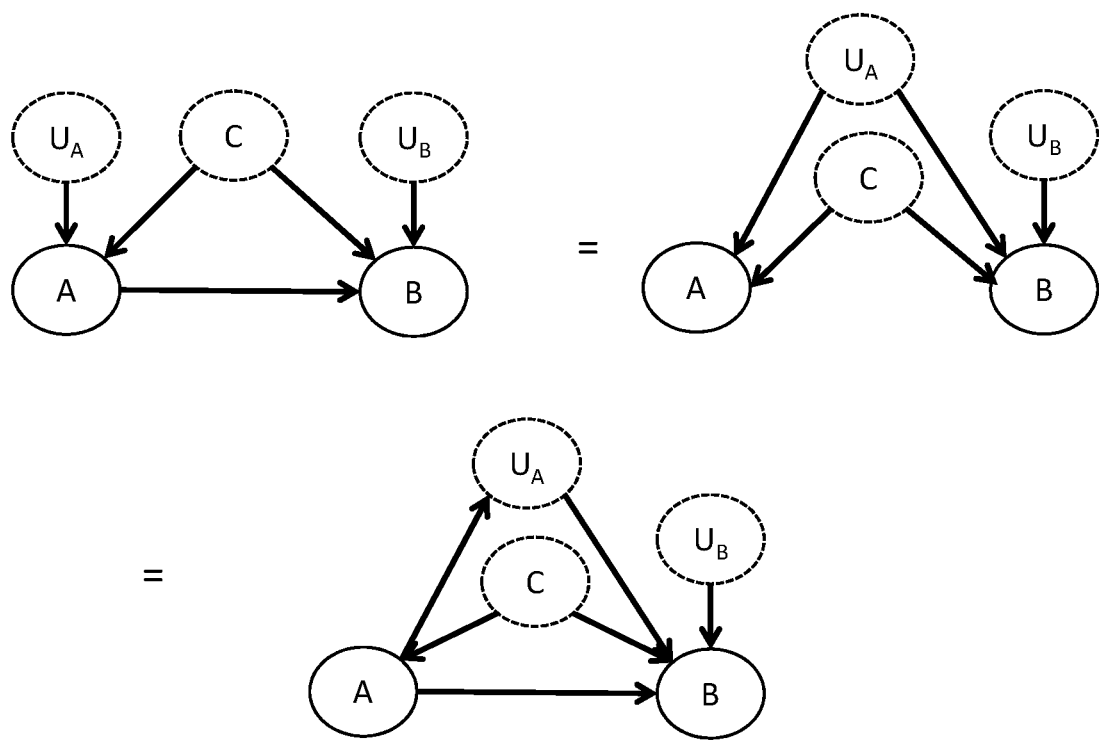
FIG. 6 shows causal structures demonstrating reduction from direct and common cause to two common causes.

For example, the reduction from FIG. 4(a) to a causal structure involving two common causes is outlined graphically in the first two causal structures from FIG. 6.

Given a causal model with only a single common cause, manifold learning or dimensionality reduction algorithms can be utilised to determine the parametrization (up to resealing, etc.) of common cause that best fits the data. Any manifold learning or dimensionality reduction algorithm, such as the Isomap algorithm of Tenembaum et al. (Tenenbaum, J. B.; De Silva, V.; and Langford, J. C. 2000. A global geometric framework for nonlinear dimensionality reduction. science 290(5500):2319-2323), can be used to accomplish this.

Given this, one then needs to determine the original pre-reduced causal structure underlying the causal model. That is, from knowledge of the approximate parameterization of the common cause in the reduced model, one needs to distinguish the original pre-reduced causal structure? Consider the task of distinguishing the three causal structures in FIG. 3. Note that the common cause in the reduced models of FIG. 3(a) and FIG. 3(b) are the variables which were originally the latent noise terms for each of the causes, i.e. $u_A$ in FIG. 3(a) and $u_B$ in FIG. 3(b).

Figure 5:
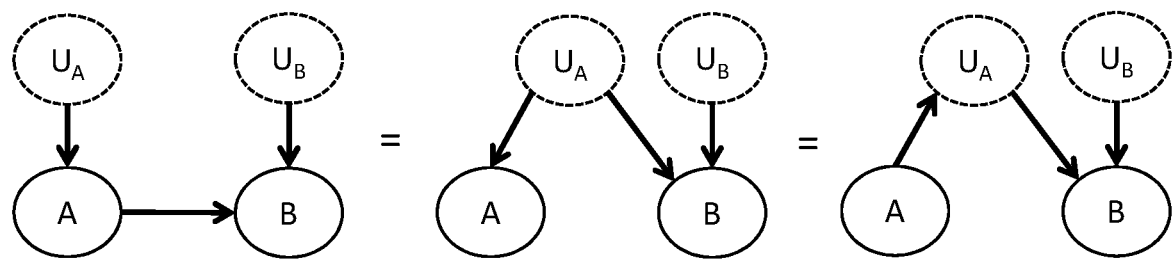

The reduced model of FIG. 3(a) is, without loss of generality, given by $A = u_A$ and $BB = B(A, u_B B)$ As discussed above, these functional relationships are consistent with the second causal structure in FIG. 5. But they are also consistent with the third causal structure in FIG. 5. That is, the relationship $A = u_A$ is consistent with an arrow from $u_A$ to A, but also with an arrow from A to $u_A$. Note that none of the other arrows in the causal structure can be reversed due to the independence between the latent variables $u_A$ and $u_B$. That is, reversing the arrow from $u_A$ to B in FIG. 5 would induce correlations between $u_A$ and $u_B$. As all latent noise variables are independent by definition, this is not possible.

Hence one can distinguish between the causal structures from FIG. 3 by reducing to a common cause via dimensionality reduction and determining which arrow from this common cause to the observed variables can be reversed (if any). If the arrow to A can be reversed then the causal structure is FIG. 3(a) if the arrow to B can be reversed the structure is FIG. 3(b) and if no arrow can be reversed then the structure is FIG. 3(c).

Any directed causal discovery algorithm that can distinguish between the causal structures FIG. 3(a) and FIG. 3(b), such as the KCDC algorithm or the additive noise algorithm discussed above, can be used to determine if the an arrow from the common cause resulting from the dimensionality reduction step can be reversed. Hence the problem of distinguishing all of the causal structures depicted in FIG. 3 is here reduced to distinguishing between directed causal influence. The general idea of the new algorithm sketched above is outlined graphically in FIG. 5.

The causal discovery algorithm described above is summarized in algorithm 1.

---

Algorithm 1

---

Input: A;B samples, manifold learning algorithm M, directed causal discovery algorithm D.
Output: Single causal structure from Figure. 3.
1: Run M on A;B to obtain parameterisation (up to rescaling) of common cause T
that best fits data.
2: Implement D between T & A and T & B
3: if D outputs T→A, A→T & T→B, but not B→Tdo:
4: Output DAG from Figure 3(a)
5: else if D outputs T → B, B →T & T →A, but not A →T do:
6: Output DAG from Figure 3(b)
7: else if D outputs T → B & T → A, but not B→T and A→T do:
8: Conclude T is a common cause of A;B
9: and output DAG from Figure 3(c)
10: return DAG output from above

---

For algorithm 1 to output the DAG from FIG. 3(a) or FIG. 3(b) the directed causal discovery algorithm D had to output both T→A and A→T. When will such a directed causal discovery algorithm do this? What is a good decision criterion for deciding this?

In an embodiment, algorithms that decide the causal direction using some quantifiable notion of asymmetry between cause and effect can be used. In general, such algorithms assign a real scalar to each causal direction $v_{A \to B}$ and $v_{B \to A}$, which quantifies the asymmetry between cause and effect present in the data. The algorithm then outputs the causal direction with the smallest v value.

Due to noise $v_{A \to B}$ will never exactly equal $v_{B \to A}$. In an embodiment a decision threshold δ is set such that if $$|v_{A \to B} - v_{B \to A}| < \delta$$

then the algorithm outputs both A→B and B→A. To assign confidence to the result, in an embodiment the algorithm could be run a number of times and output both A→B and B→A if the above relation holds in a majority of cases. In a further embodiment, a more nuanced approach would be to use a bootstrapped version of Levene's test to determine if the variances $v_{A→B}$ and $v_{B→A}$ are sufficiently different.

Finally, in an embodiment if one is interested in simultaneously checking whether T→A, A→T&T→B, are consistent with the data, but B→T is not, the following heuristic could be employed: check if $$\Delta = \frac{||v_{A→T} - v_{T→A}| - |v_{B→T} - v_{T→B}||}{\max(|v_{A→T} - v_{T→A}|, |v_{B→T} - v_{T→B}|)}$$

lies in the region (α, 19 for some pre-specified decision threshold α. This follows as in such a situation $|v_{A=T} - v_{T→A}| < \delta$ and $|v_{B→T} - v_{T→B}| > \delta$ for small δ. That is, the first term is generally close to zero, while the second is not.

Alternatively, if $\Delta \in (0, \alpha]$, then the data is consistent with T→B & T→A, but not B→T and A→T, as in this case $|v_{A→T} - v_{T→A}| > \delta$ and $|v_{B→T} - v_{T→B}| > \delta$. Hence, both terms in the numerator can be thought of as being on the same order of magnitude.

To assign confidence to the value of Δ in the above heuristic, in an embodiment one could take a bootstrapped approach and calculate the mean of the Δ's output by running the algorithm on subsamples of the input data. Moreover, the variance of the Δ's calculated in this manner encodes information of the correct DAG. For instance, small variance is consistent with a directed causal structure and large variance is consistent with a common cause. This follows because for a directed causal structure one of the terms in the numerator of Δ must lie in the region [0, δ), for δ small, and hence cannot vary much. For a common cause both terms are outside this region and hence can vary more.

The decision criterion used in the remainder of this work is as follows. The mean and variance of Δ's output by running the algorithm on subsamples of the input data are computed. If the mean is above some threshold and the variance below another, the algorithm outputs a directed causal structure. If, however, the mean is below and the variance above their corresponding thresholds, then a common cause structure is output.

Figure 7:
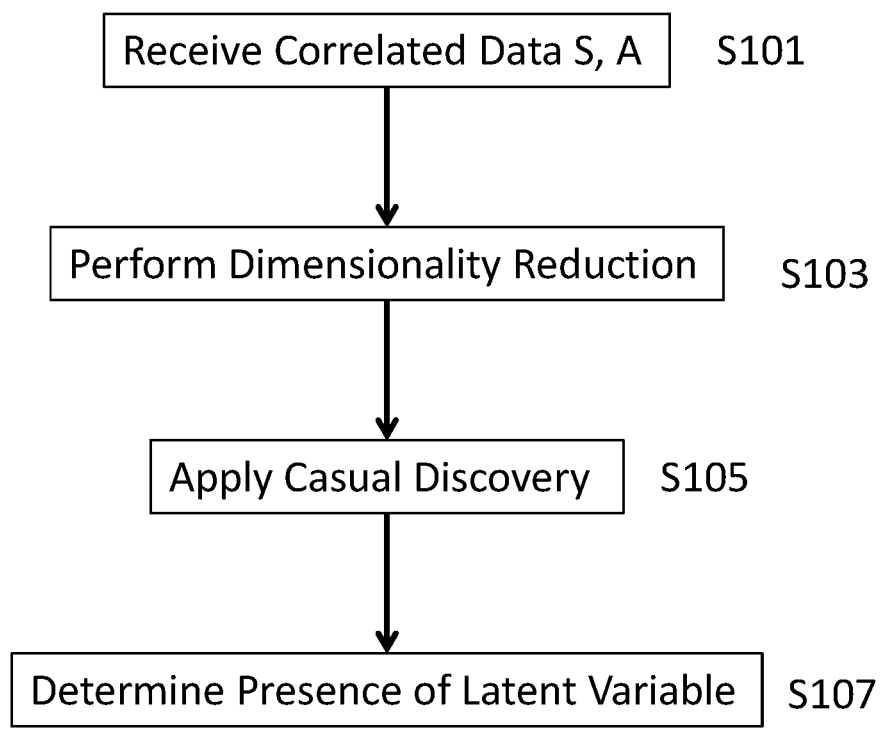
FIG. 7 is a flow chart depicting a method in accordance with an embodiment.

As a summary of the above, FIG. 7 is a flow chart showing a method in accordance with an embodiment. In step S101, correlated data is received. This example will be used to determine if smoking causes angina. First, the co-occurrence of smoking (S) and angina (A) is calculated from electronic health records (EHRs). That is, the number of patients who both smoke and have been diagnosed with angina is divided by the total number of patients in the EHR. This indicates whether these two quantities are correlated and gives us the joint probability of them both occurring. This shows that these two variables are good candidates for using with this algorithm.

This shows how two medical variables are correlated can be straightforwardly extracted from Electronic Health Records (EHRs). S and A can be sampled, by considering a single patient as a single sample. That is, if one patient both smokes and has angina then S=1 and A=1. If a patient smokes but doesn't have angina, then S=1 and A=0. And so on.

In this simplified algorithm, it would be presumed that the algorithm is just trying to distinguish between the causal structures shown in FIGS. 3(a) to 3(c).

Here, the aim is to look for a single possible latent cause that determines variables S and A.

Samples are taken from S and A, calculated as above from some EHR. In an embodiment, to ensure that these sample don't result in numerical errors, such as singular matrices, etc., some noise is added to them. So instead of being 0, a variable will be normally distributed in [0,½) and instead of 1, it will be distributed in (½,1].]

In step S103, any dimensionality reduction/manifold learning algorithm—such as ICA, PCA, ISOMAP, etc. is applied to these samples, resulting in a variable T. In this embodiment, the 2-D space defined by variables S and A is reduced to a one-dimensional space.

In step S105, a causal discovery algorithm is then applied as discussed above. In an embodiment, possible algorithms that can be used are Additive Noise Model (ANM), Kernel Conditional Deviation Causal discovery (KCDC), or Information Geometric Causal discovery (IGC)—to S & T and A & T. In the KCDC algorithm for instance, the samples are embedded in a reproducing kernel Hilbert space using a conditional kernel mean embedding. The ambient norm in the Hilbert space then induces a norm on the conditional distribution between the variables—P(A|S) and P(S|A)—and uses this to decide whether S→A or A→S.

Finally, in step S107, the rules from Algorithm 1 in the paper are then employed to decide whether S→A (smoking causes angina), A→S (angina causes smoking—unlikely), or there is a common cause between Smoking and Angina (some genetic predisposition to both craving nicotine and developing angina, say), S←→A.

Figure 8:
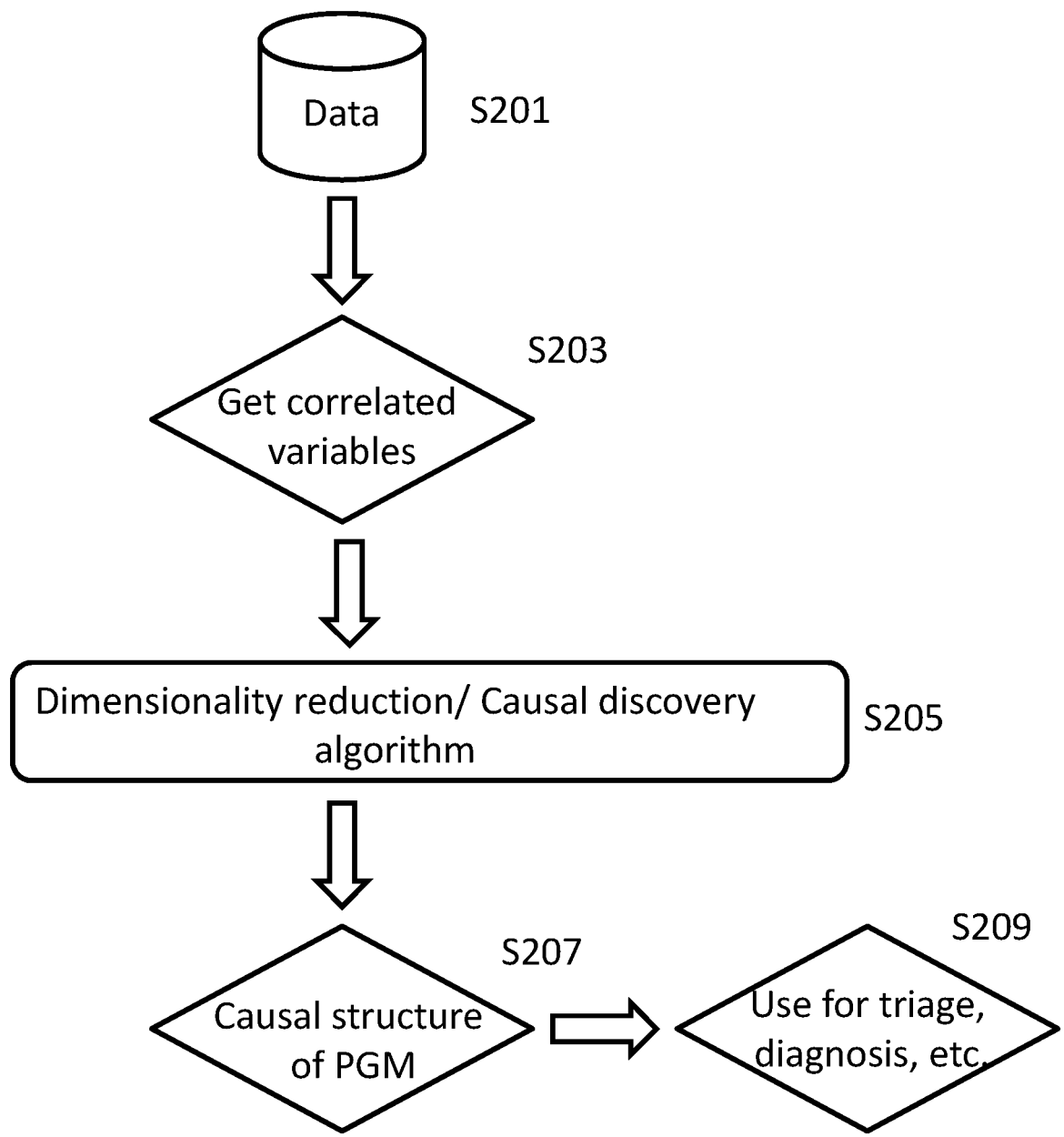
FIG. 8 is a flow chart showing a method in accordance with a further embodiment.

FIG. 8 is a flow chart showing how the process of FIG. 7 fits into the system described with reference to FIG. 1.

In step S201, the data is received as described and correlated variables are extracted in steps S201 and S203 as described above in relation to FIG. 7. Dimensionality reduction and causal discovery algorithm are applied in step S205 as described for FIG. 7. This allows the direction of edges between variables and the presence of latent common causes to be determined and hence, it allows the structure of a PGM between two variables to be determined in step S207.

There is a standard approach to scaling up from two observed variables, to many. This approach attempts to reconstruct the skeleton of the causal structure, that is, the (partially) undirected version of the DAG using one of two different methods: conditional independence or score based tests. These methods have been—in some cases—scaled up to hundreds and thousands of variables. The conditional independence approach employs conditional independence tests between the variables in question to determine which should share an edge in the causal structure. Examples include the PC algorithm (Spirtes, Glymour, and Scheines 2000), the IC algorithm (Pearl 2009), as well as algorithms which allow for latent variables (Silva et al. 2006) and selection bias (Spirtes, Meek, and Richardson 1995). The score based approach introduces a scoring function, such as Minimum Description Length, that evaluates each network with respect to some training data, and searches for the best network according to this function (Friedman, Geiger, and Goldszmidt 1997). The main limitation of these algorithms is that they are not always able to orient edges between dependent variables in the causal structure. That is, given correlated variables A and B, the above methods are unable to distinguish between the causal structures depicted in FIGS. 3 and 4. However, this can be remedied by combining this with the method of FIG. 7 and algorithm 1.

In step S209, the resultant PGM is then used for triage, diagnosis etc. For, example, this can be as described with reference to FIG. 9.

Figure 9:
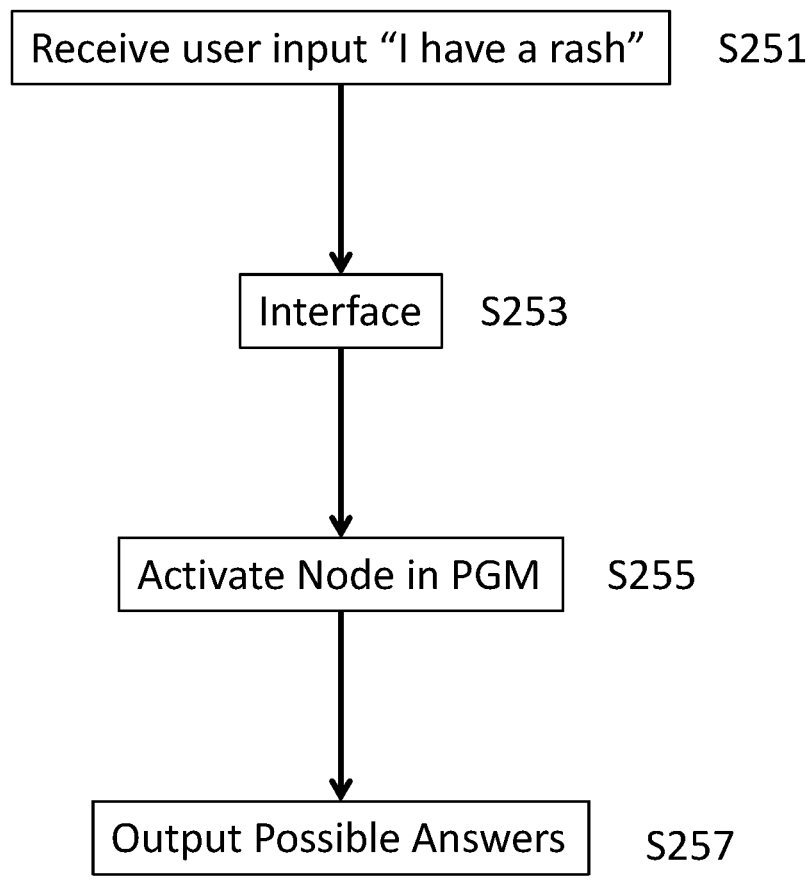
FIG. 9 is a flow chart in accordance with an embodiment, showing a dialogue supported by a PGM generated as described in FIG. 9.

In step S251 of FIG. 9, the user inputs the phrase, for example, "I have a rash" into, for example, the mobile telephone of FIG. 1. This phrase is then passed to the interface S253 that is used to identify a node in the PGM that relates to the user's query.

The node in the PGM is activated in step S255. The PGM is built using the method described with reference to FIGS. 7 and 8. Once an evidence node has been activated in the PGM, Bayesian inference can then be performed to output possible causes in step S257 for the user's symptoms or further questions that will allow the possible causes for the user's symptoms to be narrowed.

In the above embodiments, a directed causal algorithm is turned into one that can also detect common causes depends on the original directed causal discovery algorithm, as outlined explicitly in algorithm 1, the identifiability of the new algorithm is inherited from the original directed algorithm. It is also tied to the form of manifold learning or dimensionality reduction used. If the relation between the variables is non-linear, then a linear dimensionality reduction algorithm will not in general return the correct causal structure. Hence in an embodiment, a non-linear algorithm such as Isomap (Tenenbaum, J. B.; De Silva, V.; and Langford, J. C. 2000. A global geometric framework for nonlinear dimensionality reduction. science 290(5500): 2319-2323) is used.

To demonstrate the above embodiments new algorithm the kernel conditional deviance (KCDC) algorithm of Mitrovic, J.; Sejdinovic, D.; and Teh, Y. W. 2018. Causal inference via kernel deviance measures arXiv preprint arXiv:1804.04622, which can only distinguish the two DAGs from FIGS. 3(a) and (b), is turned into an algorithm that can distinguish all causal structures in FIG. 3.

First, the algorithm will be tested on synthetic datasets for both purely directed and purely common cause, showing the new algorithm maintains the high level of performance on the purely directed set as the original KCDC algorithm. These directed sets are then used to set the thresholds for the decision criterion discussed above. These thresholds will be used on the purely common cause synthetic datasets. Finally, the algorithm will be tested on real data, where the ground truth is known.

For all experiments, a radial basis function kernel with fixed hyperparameters was used; in further embodiments, this can be extended to a multiple kernel majority vote following the approach defined in (Mitrovic, Sejdinovic, and Teh 2018), though performance with a single basic kernel proved highly effective.

The thresholds for $\alpha$ and were set by preliminary empirical experimentation on simulated directed and common cause models, and used for all the following experiments.

Directed Causal Structures

In all the below experiments, 100 datasets each of 250 observations were sampled. In each case $A \in (0; 1)$.

The above algorithm was tested across three different noise regimes: standard Normal $n_B \in (0; 1)$, Uniform $n_B \in (0; 1)$, and Exponential $n_B \in \varepsilon(1)$.

The results are presented in Table 1.

TABLE 1

Directed cause experiments with different noise distributions evaluated using the KCDC algorithm and the new algorithm.

| | | | Directed Cause | | |
|---|---|---|---|---|---|
| Experiment | Noise | Algorithm | Normal | Uniform | Exponential |
| 1 | Additive | New | 99% | 100% | 98% |
| | | KCDC | 100% | 100% | 100% |
| 2 | Additive | New | 99% | 100% | 98% |
| | | KCDC | 100% | 100% | 100% |
| 3 | Multiplicative | New | 100% | 100% | 100% |
| | | KCDC | 100% | 100% | 100% |
| 4 | Multiplicative | New | 100% | 99% | 100% |
| | | KCDC | 100% | 100% | 100% |
| 5 | Complex | New | 98% | 98% | 98% |
| | | KCDC | 100% | 100% | 100% |
| 6 | Complex | New | 100% | 97% | 99% |
| | | KCDC | 100% | 100% | 100% |

Additive Noise:

$$B = \sin(10A) + e^{3A} + n_B; \tag{1}$$

$$B = \log(A+10) + A^6 + n_B \tag{2}$$

Multiplicative Noise:

$$B = (\sin(10A) + e^{3A})e^{n_B} \tag{3}$$

$$B = (A^2 + A^5)e^{n_B} \tag{4}$$

Complex Noise:

$$B = A^5 - \sin(A^2|n_B|) \tag{5}$$

$$B = \log(A+10) + A^{8n_B} \tag{6}$$

Common Cause 100 datasets were sampled each of 250 observations, with the common cause $T \in (0; 1)$. T2 N(0; 1). Testing was performed across three different noise regimes: Normal $n_A$, $n_B \in (0; 1)$, Uniform $n_A$, $n_B \in (0; 1)$, and Exponential $n_A$, $n_B \in \varepsilon(1)$.

Results are presented in Table 2.

TABLE 2

Common cause experiments with different noise distributions evaluated using the new algorithm.

| | | Common Cause | | |
|---|---|---|---|---|
| Experiment | Noise | Normal | Uniform | Experimental |
| 1 | Additive | 96% | 95% | 97% |
| 2 | Additive | 98% | 95% | 96% |
| 3 | Multiplicative | 94% | 99% | 95% |

TABLE 2-continued

Common cause experiments with different noise
distributions evaluated using the new algorithm.
Common Cause

| Experiment | Noise | Normal | Uniform | Experimental |
|---|---|---|---|---|
| 4 | Multiplicative | 95% | 96% | 96% |
| 5 | Additive & Multiplicative | 97% | 100% | 95% |
| 6 | Additive & Multiplicative | 96% | 95% | 96% |

Additive Noise:

$$A=\sin(10T)+e^{3T}+n_A; \quad (1)$$

$$B=\log(T+10)+T^6+n_B$$

$$A=\log(T+10)+T^6+n_A \quad (2)$$

$$B=T^2+T^6+n_B$$

Multiplicative Noise:

$$A=(\sin(10T)+e^{3T})e^{n_A} \quad (3)$$

$$B=(T^2+T^6)e^{n_B}$$

$$A=(\sin(10T)+e^{3T})e^{n_A} \quad (4)$$

$$B=(\log(T+10)+T)e^{n_B}$$

Additive and Multiplicative Noise:

$$A=\log(T+10)+T^6+n_A \quad (5)$$

$$B=(T^2+T^6)e^{n_B}$$

$$A=\sin(10T)+e^{3T}+n_A \quad (6)$$

$$B=(T^2+T^6)e^{n_B}$$

Common Cause Robustness Tests

The above experiments demonstrate the robustness of the algorithm in different noise regimes. The following test demonstrates the algorithm's robustness to more complex functional relationships.

First, the accuracy of the algorithm is tested in two regimes beyond additive and multiplicative noise. Next functions drawn from Gaussian Processes are tested—a true analysis of robustness to changes in the underlying functions.

TABLE 3

Complex noise common cause experiments
evaluated using the new algorithm.
Complex Noise Common Cause

| Experiment | Noise | Result |
|---|---|---|
| 1 | Complex | 95% |
| 2 | Complex | 95% |
| 3 | GP | 90% |
| 4 | GP | 91% |

Complex Noise $$A=T^6-\sin(T^2 n_A); \quad (1)$$

$$B=(\log(T+10)+T^6)^{2n_B}$$

$$A=\log(T^4+10)+T^6-\sin(10 n_A T^2) \quad (2)$$

$$B=\log(T+10)^{n_B}$$

Gaussian Process Generators (1) Let $A=f(T)e^{n_A}$ and $B=g(T)e^{n_B}$, with f and g drawn from the same Gaussian Process, with the kernel given by sum of polynomial (only with $T^2+T^6$ terms) and periodic exponential.

(2) Here, f is drawn from polynomial kernel (only with $T^2+T^6$ terms) and g is drawn from kernel corresponding to sum of polynomial (only with $T^3+T^6$ terms) and periodic exponential.

The algorithm of the above embodiments is now tested on real world data sets. The first of which is the *Breast Cancer Wisconsin* (*Diagnostic*) *Data* (Lichman, M. 2013. UCI machine learning repository. URL http://archive.ics.uci.edu/ml). Here the diagnosis of the cancer (malignant or benign) is expected to be a common cause of two of the other attributes from the dataset, "perimeter" and "compactness". Our algorithm returns that these two at-tributes have a common cause within the thresholds set from the previous section. In this situation it is also easy to check that perimeter and compactness are indeed conditionally independent given diagnosis.

The next dataset tested is the Auto MPG data from (Lichman 2013). Here, attributes "acceleration" and "MPG" (Miles per Gallon) are correlated but expected to have a common cause, the model year of the car in question. The algorithm returns a common cause between "acceleration" and "MPG". Again this is corroborated by checking conditional independence between "accel-eration" and "MPG" given the model year.

The last dataset is the Abalone data, also from (Lichman 2013). In this dataset, the attributes "length" and "diameter" are correlated but expected to have a common cause given by age and height of the shell. The algorithm described above returns a common cause relation between these two attributes.

In the above embodiments, a causal discovery algorithm, for example, the KCDC algorithm which could distinguish A→B and A←B was modified to be able to also detect latent common causes without sacrificing its high accuracy in distinguishing directed causal structures. The modified algorithm was extensively tested on synthetic data, showing the robustness of the method of the above embodiment to different noise regimes and complex functional relationships. Moreover, the algorithms in accordance with the above embodiments enabled the KCDC algorithm to detect latent confounders in real world datasets.

Figure 10:
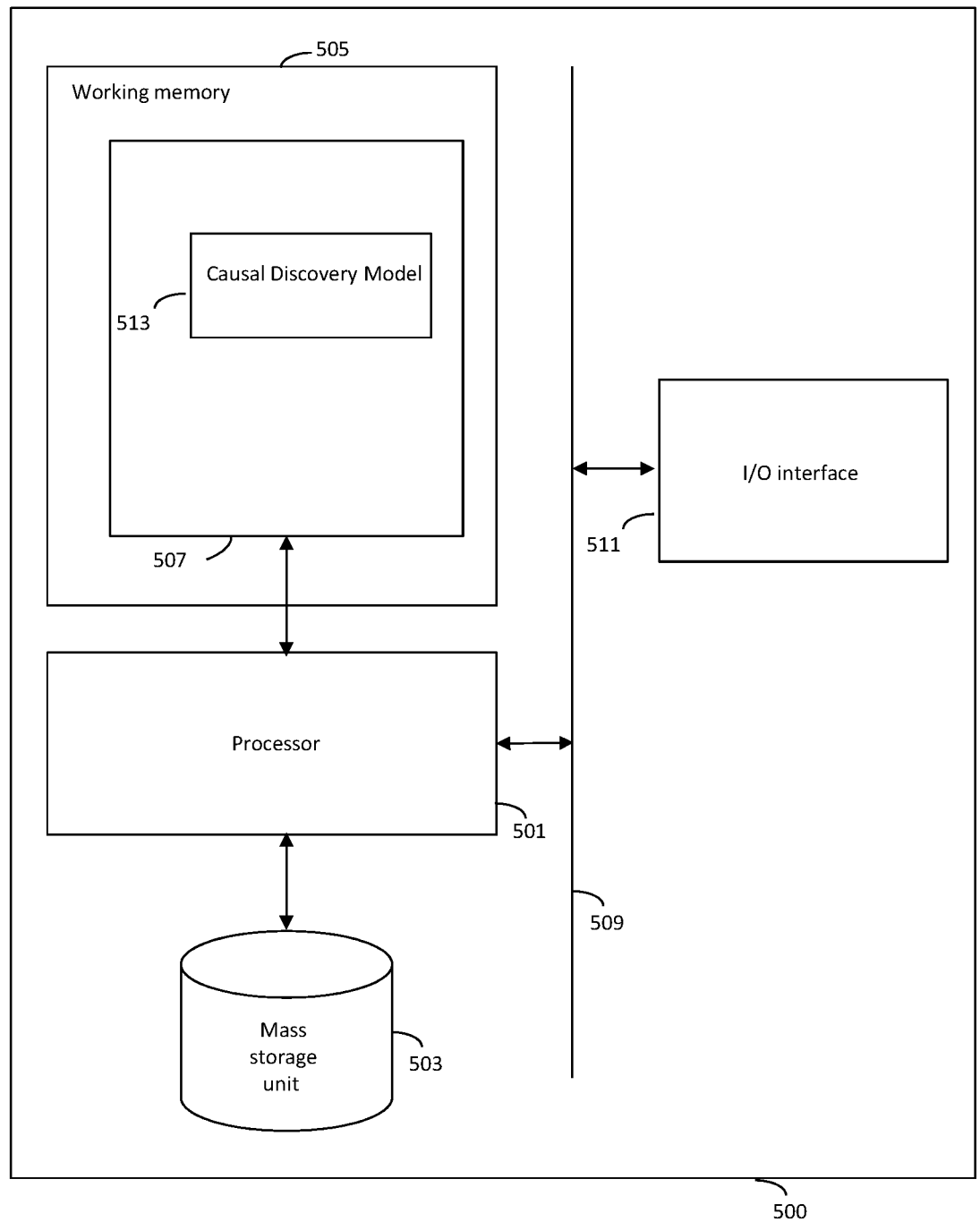
FIG. 10 is a schematic of a system in accordance with an embodiment.

While it will be appreciated that the above embodiments are applicable to any computing system, an example computing system is illustrated in FIG. 10, which provides means capable of putting an embodiment, as described herein, into effect. As illustrated, the computing system 500 comprises a processor 501 coupled to a mass storage unit 503 and accessing a working memory 505. As illustrated, a survival analysis model 513 is represented as software products stored in working memory 505. However, it will be appreciated that elements of the survival analysis model 513, may, for convenience, be stored in the mass storage unit 503. Depending on the use, the survival analysis model 513 may be used with a chatbot, to provide a response to a user question that requires the survival analysis model.

Usual procedures for the loading of software into memory and the storage of data in the mass storage unit 503 apply. The processor 501 also accesses, via bus 509, an input/output interface 511 that is configured to receive data from and output data to an external system (e.g. an external network or a user input or output device). The input/output interface 511 may be a single component or may be divided into a separate input interface and a separate output interface.

Thus, execution of the survival analysis model 513 by the processor 501 will cause embodiments as described herein to be implemented.

The survival analysis model 513 can be embedded in original equipment, or can be provided, as a whole or in part, after manufacture. For instance, the causal discovery model 513 can be introduced, as a whole, as a computer program product, which may be in the form of a download, or to be introduced via a computer program storage medium, such as an optical disk. Alternatively, modifications to existing causal discovery model software can be made by an update, or plug-in, to provide features of the above described embodiment.

The computing system 500 may be an end-user system that receives inputs from a user (e.g. via a keyboard) and retrieves a response to a query using causal discovery model 513 adapted to produce the user query in a suitable form. Alternatively, the system may be a server that receives input over a network and determines a response. Either way, the use of the causal discovery model 513 may be used to determine appropriate responses to user queries, as discussed with regard to FIG. 1.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

In the above embodiments, a purely directed causal discovery algorithm is converted into one that can also detect latent common causes. The modified algorithm is tested extensively on synthetic and real datasets. In the experiments explained above, the modified algorithm maintained the performance of the original algorithm on the directed datasets and allowed algorithms that originally could not detect latent causes to uncover them in both synthetic and real data.

The above embodiments can be applied to purely directed causal discovery algorithms to allow them to be extended to detect causal structures with both directed and latent common causes. Further, the above method can be applied to the field of quantum causal models.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A computer-implemented method of generating a probabilistic graphical model with causal information, said graphical model containing a causal relationship between a first variable and a second variable, the method comprising:
   receiving data at a processor, said data showing a correlation between the first variable and the second variable, wherein the first variable and the second variable are observed variables;
   generating a graphical representation of the data defined by the first variable and the second variable;
   modifying the graphical representation to replace a direct causal relationship between the first variable and the second variable with a latent common cause between the first variable and the second variable;
   determining a manifold in the modified graphical representation;
   deriving a third variable from the manifold, the third variable describing the manifold, wherein the third variable is a parametrization of the latent common cause;
   applying a causal discovery algorithm to the modified graphical representation to determine the causal relationship between the first and third variables and the second and third variables, the causal discovery algorithm being able to determine if the first variable causes the third variable, the third variable causes the first variable, the second variable causes the third variable, and the third variable causes the second variable, comprising:
      determining a first one or more values quantifying the asymmetry in the causal relationship between the first variable and the third variable; and
      determining a second one or more values quantifying the asymmetry in the casual relationship between the third variable and the second variable;
   determining the structure of the causal relationship between the first and second variables, comprising:
      calculating a heuristic based on the first one or more values and the second one or more values;
      in response to the heuristic being below a decision threshold, determining that the third variable causes the first and second variables and that the third variable is not caused by the first or second variables;
      in response to the third variable causing the first and second variables and the third variable not being caused by the first or second variables, determining that a latent variable is the cause of the first and second variables, wherein the latent variable is an unobserved variable; and
   outputting a graphical model with the determined causal structure, said causal structure indicating the direction of edges in a graphical representation of said graphical model, the graphical model utilized for triage or diagnosis, wherein the graphical model comprises, in response to the latent variable being determined to be the cause of the first and second variables, the first node, the second node, a third node representing the latent variable, a directed edge from the third node to the first node, and a directed edge from the third node to the second node.

2. The computer-implemented method according to claim 1, wherein the manifold is described by a single third variable and determining a manifold reduces the dimensionality of the graphical representation from two dimensions to one dimension.

3. The computer-implemented method according to claim 1, wherein determining the structure of the causal relationship comprises determining that the first variable causes the second variable if the third variable causes the first and second variables, the third variable is caused by the first variable, but where the third variable is not caused by the second variable.

4. The computer-implemented method according to claim 1, wherein determining the structure of the causal relationship comprises determining that the second variable causes the first variable if the third variable causes the first and second variables, the third variable is caused by the second variable, but where the third variable is not caused by the first variable.

5. The computer-implemented method according to claim 1, wherein the causal discovery algorithm determines whether a variable causes another variable by evaluating asymmetry between the variables.

6. The computer-implemented method according to claim 5, wherein the causal discover algorithm is KCDC or an additive noise model.

7. The computer-implemented method according to claim 1, wherein the first and second variables are binary variables and wherein noise is added to the binary variables prior to the determination of the manifold.

8. The computer-implemented method according to claim 1, wherein the manifold is determined using a non-linear algorithm.

9. The computer-implemented method according to claim 8, wherein the algorithm is selected from Isomap, PCA, or ICA.

10. The computer-implemented method according to claim 1, wherein the probabilistic graphical model is a medical probabilistic graphical model.

11. The computer-implemented method according to claim 10, wherein the medical probabilistic graphical model comprises diseases, symptoms, and risk factors as variables.

12. A computer-implemented method of determining a response to a user inputted query, using a probabilistic graphical model, the method comprising:
receiving a user inputted query;
identifying a node in said probabilistic graphical model "PGM" related to said query, said PGM being stored in a memory of a computer; and
performing inference on said PGM to provide a response to said user, wherein, said graphical model contains a causal relationship between a first variable and a second variable, the PGM being constructed by:
receiving data at a processor, said data showing a correlation between the first variable and the second variable, wherein the first variable and the second variable are observed variables;
generating a graphical representation of the data defined by the first variable and the second variable;
modifying the graphical representation to replace a direct causal relationship between the first variable and the second variable with a latent common cause between the first variable and the second variable;
determining a manifold in the modified graphical representation;
deriving a third variable from the manifold, the third variable describing the manifold, wherein the third variable is a parametrization of the latent common cause;
applying a causal discovery algorithm to the modified graphical representation to determine the causal relationship between the first and third variables and the second and third variable, the causal discovery algorithm being able to determine if the first variable causes the third variable, the third variable causes the first variable, the second variable causes the third variable, and the third variable causes the second variable, comprising:
determining a first one or more values quantifying the asymmetry in the causal relationship between the first variable and the third variable;
determining a second one or more values quantifying the asymmetry in the casual relationship between the third variable and the second variable;
determining the structure of the causal relationship between the first and second variables, comprising
calculating a heuristic based on the first one or more values and the second one or more values;
in response to the heuristic being below a decision threshold, determining that the third variable causes the first and second variables and that the third variable is not caused by the first or second variables;
in response to the third variable causing the first and second variables and the third variable not being caused by the first or second variables, determining that a latent variable is the cause of the first and second variables, wherein the latent variable is an unobserved variable; and
outputting a graphical model with the determined causal structure, said causal structure indicating the direction of edges in a graphical representation of said graphical model, the graphical model utilized for triage or diagnosis, wherein the graphical model comprises, in response to
the latent variable being determined to be the cause of the first and second variables, the first node, the second node, a third node representing the latent variable, a directed edge from the third node to the first node, and a directed edge from the third node to the second node.

13. A system adapted to generate a probabilistic graphical model with causal information, said graphical model containing the causal relationship between a first variable and a second variable, the system comprising a processor and a memory, the processor being adapted to:
receive data from a database, said data showing a correlation between the first variable and the second variable, wherein the first variable and the second variable are observed variables;
generate a graphical representation of the data defined by the first variable and the second variable;
modify the graphical representation to replace a direct causal relationship between the first variable and the second variable with a latent common cause between the first variable and the second variable;
determine a manifold in the modified graphical representation;

derive a third variable from the manifold, the third variable describing the manifold, wherein the third variable is a parametrization of the latent common cause;

apply a causal discovery algorithm to the modified graphical representation to determine the causal relationship between the first and third variables and the second and third variable, the causal discovery algorithm being able to determine if the first variable causes the third variable, the third variable causes the first variable, the second variable causes the third variable, and the third variable causes the second variable, comprising:

determining a first one or more values quantifying the asymmetry in the causal relationship between the first variable and the third variable;

determining a second one or more values quantifying the asymmetry in the casual relationship between the third variable and the second variable;

determine the structure of the causal relationship between the first and second variables, comprising:

calculating a heuristic based on the first one or more values and the second one or more values;

in response to the heuristic being below a decision threshold, determining that the third variable causes the first and second variables and that the third variable is not caused by the first or second variables;

in response to the third variable causing the first and second variables and the third variable not being caused by the first or second variables, determining that a latent variable is the cause of the first and second variables, wherein the latent variable is an unobserved variable; and output a graphical model with the determined causal structure, the graphical model utilized for triage or diagnosis, wherein the graphical model comprises, in response to the latent variable being determined to be the cause of the first and second variables, the first node, the second node, a third node representing the latent variable, a directed edge from the third node to the first node, and a directed edge from the third node to the second node.

14. A non-transitory carrier medium carrying computer-readable instructions being adapted to cause a computer to perform a method for determining the causal relationship between a first variable and a second variable, the method comprising:

receiving data, said data showing a correlation between the first variable and the second variable, wherein the first variable and the second variable are observed variables;

generating a graphical representation of the data defined by the first variable and the second variable;

modifying the graphical representation to replace a direct causal relationship between the first variable and the second variable with a latent common cause between the first variable and the second variable;

determining a manifold in the modified graphical representation;

deriving a third variable from the manifold, the third variable describing the manifold, wherein the third variable is a parametrization of the latent common cause;

applying a causal discovery algorithm to the modified graphical representation to determine the causal relationship between the first and third variables and the second and third variable, the causal discovery algorithm being able to determine if the first variable causes the third variable, the third variable causes the first variable, the second variable causes the third variable, and the third variable causes the second variable, comprising:

determining a first one or more values quantifying the asymmetry in the causal relationship between the first variable and the third variable;

determining a second one or more values quantifying the asymmetry in the casual relationship between the third variable and the second variable;

determining the structure of the causal relationship between the first and second variables, comprising:

calculating a heuristic based on the first one or more values and the second one or more values;

in response to the heuristic being below a decision threshold, determining that the third variable causes the first and second variables and that the third variable is not caused by the first or second variables;

in response to the third variable causing the first and second variables and the third variable not being caused by the first or second variables, determining that a latent variable is the cause of the first and second variables, wherein the latent variable is an unobserved variable; and outputting a graphical model with the determined causal structure, the graphical model utilized for triage or diagnosis, wherein the graphical model comprises, in response to the latent variable being determined to be the cause of the first and second variables, the first node, the second node, a third node representing the latent variable, a directed edge from the third node to the first node, and a directed edge from the third node to the second node.

* * * * *